(12) United States Patent
Haynes et al.

(10) Patent No.: US 11,715,908 B2
(45) Date of Patent: Aug. 1, 2023

(54) ELECTRICAL CONNECTOR FOR A PHOTOVOLTAIC MODULE

(71) Applicant: Zinniatek Limited, Auckland (NZ)

(72) Inventors: Andrew Leo Haynes, Auckland (NZ); Christopher Charles Morrow, Auckland (NZ); James Robert Winton, Auckland (NZ); Johan Miros Kvasnicka, Auckland (NZ)

(73) Assignee: Zinniatek Limited, Auckland (NZ)

( * ) Notice: Subject to any disclaimer, the term of this patent is extended or adjusted under 35 U.S.C. 154(b) by 206 days.

(21) Appl. No.: 17/130,525

(22) Filed: Dec. 22, 2020

(65) Prior Publication Data
US 2022/0200209 A1 Jun. 23, 2022

(51) Int. Cl.
*H01R 13/645* (2006.01)
*H01R 43/18* (2006.01)
*H01R 13/64* (2006.01)

(52) U.S. Cl.
CPC ......... *H01R 13/6456* (2013.01); *H01R 13/64* (2013.01); *H01R 43/18* (2013.01)

(58) Field of Classification Search
CPC .. H01R 13/64; H01R 13/645; H01R 13/6453; H01R 13/6456; H01R 43/18
See application file for complete search history.

(56) References Cited

U.S. PATENT DOCUMENTS

| | | | | |
|---|---|---|---|---|
| 4,229,064 A | * | 10/1980 | Vetter | H01R 13/6456 439/680 |
| 2005/0164562 A1 | * | 7/2005 | Lee | H01R 13/6456 439/680 |
| 2010/0240242 A1 | * | 9/2010 | Pfaffenbach | H01R 13/6273 439/353 |
| 2017/0324192 A1 | * | 11/2017 | Chevreau | H01R 13/6275 |
| 2020/0169042 A1 | * | 5/2020 | Luo | H01R 13/5202 |

* cited by examiner

*Primary Examiner* — Oscar C Jimenez
(74) *Attorney, Agent, or Firm* — Foley & Lardner LLP

(57) ABSTRACT

An electrical connector includes an electrical connector body and a collar circumferentially surrounding an external surface of the electrical connector. The collar includes a hollow collar body that receives at least a portion of the electrical connector body, the collar body having a cable end and a free end. One or more fingers extend from the free end of the collar body to physically prevent incorrect mating with another corresponding component.

36 Claims, 8 Drawing Sheets

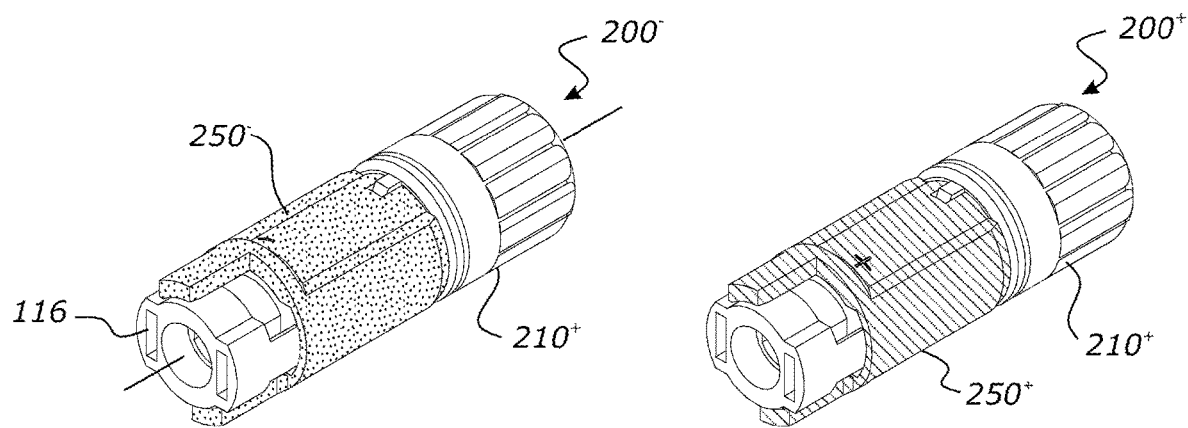
*FIG. 10A*    *FIG. 10D*
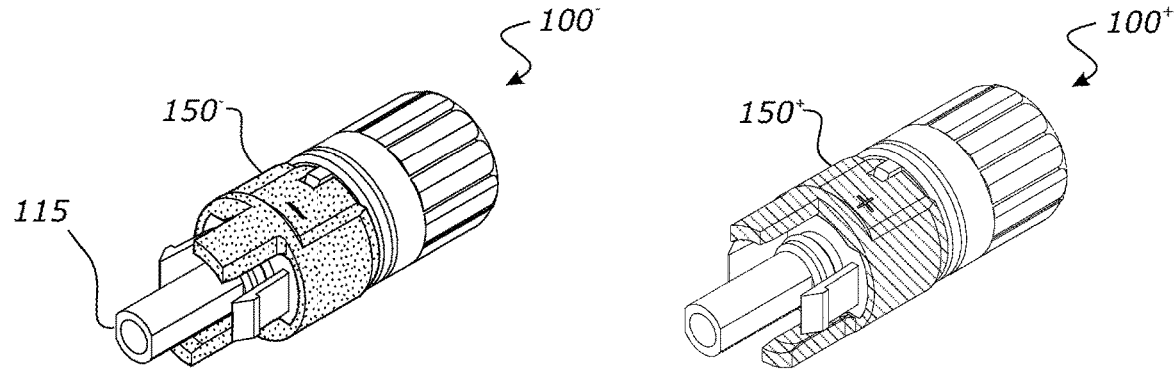
*FIG. 10B*    *FIG. 10E*
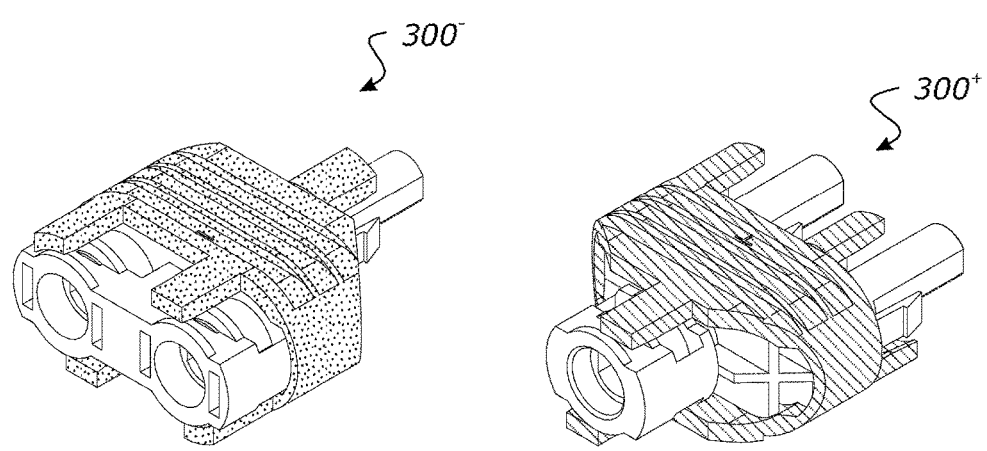
*FIG. 10C*    *FIG. 10F*

ELECTRICAL CONNECTOR FOR A PHOTOVOLTAIC MODULE

FIELD OF THE INVENTION

The present invention relates to an improved electrical connector for use in electrical systems and assemblies. More particularly, it relates to an improved electrical connector with a collar for physically preventing incorrect mating with other components in the electrical system.

BACKGROUND OF THE INVENTION

Electrical components are connected to each other in an electrical system with electrical cables to transport electrical power. For example, photovoltaic modules (photovoltaic panels, solar shingles and the like) are connected to each other and/or to other components of a PV system with electrical cables to transport electrical power. Electrical connectors are used to connect electrical cables associated with different components together to form a circuit. For example, MC4 connectors from Staubli, PV4 connectors from TE Connectivity or H4 connectors from Amphenol may be used to connect photovoltaic modules together.

Typically, PV modules are connected upon installation by installers at the intended location of the PV modules. Installing and connecting PV modules correctly can be complicated and it may be time consuming to inspect the connections to ensure the correct connections have been made.

An array of PV modules needs to be installed in a way that will correctly complete an electrical circuit. If there are multiple options for joining the electrical connectors together, the installers may connect together the modules in a way which was not intended causing the circuit to function incorrectly. This could produce dysfunctional circuits that would require the roof to be reinstalled, which is time-consuming and can be costly. For example, if the PV modules are connected incorrectly, the circuit can short circuit and cause damage.

The likelihood of incorrect connections may be particularly prominent in situations where there are multiple connection options, and where there are many connections to be made. For example, when installing Building Integrated Photovoltaic ("BIPV") roofing there are many electrical connections required to connect the individual PV shingles/tiles together to form the intended circuit.

It may therefore be desirable to improve ease of installation of PV systems, and/or reduce the likelihood of incorrect connection of electrical circuits in PV systems.

In this specification, where reference has been made to external sources of information, including patent specifications and other documents, this is generally for the purpose of providing a context for discussing the features of the present invention. Unless stated otherwise, reference to such sources of information is not to be construed, in any jurisdiction, as an admission that such sources of information are prior art or form part of the common general knowledge in the art.

It is an object of the present invention to provide an improved electrical connector, electrical connector assembly or photovoltaic system which overcomes or at least partially ameliorates some of the abovementioned disadvantages or which at least provides the public with a useful choice.

BRIEF DESCRIPTION OF THE INVENTION

According to a first aspect the invention broadly comprises an improved electrical connector comprising:

an electrical connector having an electrical connector body;

a collar circumferentially surrounding an external surface of the electrical connector; and wherein the collar comprises:

a collar body being substantially hollow configured to receive at least a portion of the electrical connector body, the collar body having a cable end and a free end;

one or more fingers extending from the free end of the collar body configured to physically prevent incorrect mating with another corresponding component.

According to another aspect the collar prevents connection of corresponding electrical connectors which would electrically connect but for the one or more fingers obstructing complete insertion.

According to another aspect the incorrect mating the collar prevents is connection of components associated with different electrical polarity.

According to another aspect the electrical connector is a male or female connector configured to connect with a corresponding electrical connector being the other of the male or female connector.

According to another aspect the one or more fingers comprises an interference surface configured to block incorrect mating with another component.

According to another aspect the interference surface is located at a free end of the finger.

According to another aspect the electrical connector comprises an insertion direction for co-axially mating with a corresponding electrical connector and the one or more fingers extends substantially parallel the insertion direction.

According to another aspect the one or more fingers extends substantially longitudinally from the collar body.

According to another aspect the collar is non-rotatable with respect to the electrical connector body.

According to another aspect n the one or more fingers are arranged at or about a perimeter of the collar at discrete positions.

According to another aspect the collar comprises two or more fingers arranged evenly around the perimeter of the collar.

According to another aspect the collar comprises two fingers arranged 180° apart.

According to another aspect the electrical connector comprises one or more registration features configured to align the electrical connector with a corresponding electrical connector in at least one natural connection orientation.

According to another aspect the one or more fingers are offset from 0 and 180° in an end view in the natural connection orientation.

According to another aspect the one or more fingers has a substantially rectangular profile when viewed from a side of the collar.

According to another aspect the collar further comprises one or more visual indicia to indicate positive or negative charge, the visual indicia being colour, marking and/or shape.

According to another aspect the collar body comprises an internal cut-out substantially along the length of the collar body complimentary to the profile of the external surface of the electrical connector body for alignment of the collar onto the electrical connector.

According to another aspect the collar body and/or the electric connector body comprises supplementary alignment elements to align the components together.

According to another aspect the supplementary alignment elements are a slot and protrusion.

According to another aspect the device further comprises a locking engagement feature for coupling the collar onto the electrical connector.

According to another aspect the engagement feature comprises a tab on the inner surface of the collar body or the outer surface of the electrical connector body.

According to another aspect the engagement feature is located on the inner surface of the collar body.

According to another aspect the tab is a ramp configured to promote insertion of the collar onto the electrical connector in one direction and prevent disengaging of the collar from the electrical connector in the opposite direction.

According to another aspect the inner surface of the collar body or the outer surface of the electrical connector body comprises a lip configured to engage with the tab to prevent disengaging of the collar from the electrical connector.

According to another aspect the collar comprises a rigid or semi-rigid material.

According to another aspect the collar is a separate component to the electrical connector.

According to another aspect the collar is removable from the electrical connector.

According to another aspect the electrical connector is a photovoltaic connector.

According to another aspect the photovoltaic connector is a QC4 connector.

According to another aspect the electrical connector is a single pole connector.

According to another aspect the collar prevents the improved electrical connector forming a connection in series and permits a connector forming a connection in parallel.

According to another aspect the invention broadly comprises an improved electrical connector comprising:
- an electrical connector being a male or female connector configured to coaxially connect with a corresponding electrical connector being the other of the male or female connector, the electrical connector having an electrical connector body;
- a collar circumferentially surrounding an external surface of the electrical connector; and
- wherein the collar comprises:
- a collar body being substantially hollow configured to receive at least a portion of the electrical connector body, the collar body having a cable end and a free end; and
- one or more fingers extending from the free end of the collar body arranged to allow or prevent physical connection with the corresponding electrical connector.

According to another aspect the invention broadly comprises an electrical connector assembly comprising:
- a female electrical connector; and
- a male electrical connector;
- wherein both the female and male electrical connectors are improved electrical connectors as described in any one of the previous clauses; and
- wherein the female and male electrical connectors are co-axial corresponding electrical connectors configured to electrically connect upon complete insertion.

According to another aspect the collar of each improved electrical connector comprises one or more fingers in one of the following arrangements:
- arranged to allow the corresponding male and female electrical connectors to make full and complete connection upon insertion; or
- arranged to obstruct full and complete insertion of the corresponding male and female electrical connectors, the corresponding electrical connectors capable of making full and complete connection but for the one or more fingers.

According to another aspect the one or more fingers of the female electrical connector engages with the one or more fingers of the male electrical connector to obstruct full and complete connection.

According to another aspect the corresponding male and female electrical connectors comprises corresponding registration features configure to align the connectors in at least one natural connection orientation.

According to another aspect the one or more fingers of the female connector are arranged such that at least one of the one or more fingers of the female connector align in the insertion direction with at least one of the one or more fingers of the male connector to physically obstruct full connection upon insertion and vice versa.

According to another aspect at least one of the one or more fingers of the corresponding female and/or male electrical connectors obstruct complete insertion of the electrical connectors when the free ends of the connectors are pushed together.

According to another aspect at least one of the one or more fingers of the female electrical connector abuts at least one of the one or more fingers of the corresponding male electrical connector to prevent complete insertion of the electrical connectors.

According to another aspect the female and male electrical connectors are associated with different electrical poles.

According to another aspect the collar of the one or more fingers of the female electrical connector is located in different positions around the perimeter of the collar to the one of the one or more fingers of the collar of the corresponding male electrical connector.

According to another aspect the one or more fingers of the female electrical connector is arranged as a geometrical reflection of the one or more fingers of the corresponding male electrical connector.

According to another aspect the one of the one or more fingers of the female electrical connector and corresponding male electrical connector do not engage and the electrical connectors can complete insertion when the free ends of the connectors are pushed together.

According to another aspect the female and male electrical connectors are associated with the same electrical pole.

According to another aspect the invention broadly comprises an electrical connector assembly comprising:
- a female electrical connector having a female natural connection orientation; and
- a male electrical connector having a male natural connection orientation;
- the female and male electrical connectors are co-axial corresponding electrical connectors configured to electrically connect upon complete insertion in the natural connection orientations;
- each electrical connector comprising a collar circumferentially surrounding an external surface of the electrical connector, the collar fixed and non-rotatable in relation to an electrical connector body;
- the collar comprises one or more fingers extending from a collar body, arranged to allow or prevent physical connection with the corresponding electrical connector upon insertion.

According to another aspect the invention broadly comprises a photovoltaic system comprising:
- one or more photovoltaic modules;

one or more improved electrical connectors as described in any one of the previous clauses to couple the one or more photovoltaic modules to another component of the photovoltaic system via electrical cables.

According to another aspect the component the photovoltaic cell is connected to is one or more of the following components:
another photovoltaic module;
junction box;
solar charge controller.

According to another aspect the invention broadly comprises a method of manufacturing a plurality of improved electrical connectors comprising:
manufacturing a plurality of electrical connectors being a male or female connector configured to coaxially connect with a corresponding electrical connector being the other of the male or female connector, the electrical connector having an electrical connector body; and
coupling a first collar to a first batch of electrical connectors,
the first collar comprising a collar body being substantially hollow configured to receive at least a portion of the electrical connector and one or more fingers configured to physically prevent or allow or prevent physical connection with the corresponding electrical connector.

According to another aspect the method further comprises coupling a second collar to a second batch of electrical connectors, the second collar comprising a collar body being substantially hollow configured to receive at least a portion of the electrical connector and one or more fingers configured to physically prevent or allow or prevent physical connection with the corresponding electrical connector.

According to another aspect the improved electrical connectors are improved electrical connectors as described in the previous clauses.

According to another aspect the one or more fingers of the first collar is arranged in different positions to the one or more fingers of the second collar.

According to another aspect the one or more fingers of the first collar is arranged as a geometrical reflection of the one or more fingers of the second collar.

According to another aspect the first collar is associated with a positive polarity, and the second collar is associated with a negative polarity.

Other aspects of the invention may become apparent from the following description which is given by way of example only and with reference to the accompanying drawings.

As used herein the term "and/or" means "and" or "or", or both.

As used herein "(s)" following a noun means the plural and/or singular forms of the noun.

The term "comprising" as used in this specification and claims means "consisting at least in part of". When interpreting statements in this specification and claims which include that term, the features, prefaced by that term in each statement, all need to be present but other features can also be present. Related terms such as "comprise" and "comprised" are to be interpreted in the same manner.

BRIEF DESCRIPTION OF THE DRAWINGS

The invention will now be described by way of example only and with reference to the drawings in which:

FIG. 10A shows a perspective view of a negative male improved electrical connector.

FIG. 10B shows a perspective view of negative female improved electrical connector.

FIG. 10C shows a perspective view of negative Y-shaped improved electrical connector.

FIG. 10D shows a perspective view of positive male improved electrical connector.

FIG. 10E shows a perspective view of positive female improved electrical connector.

FIG. 10F shows a perspective view of positive Y-shaped improved electrical connector.

DETAILED DESCRIPTION OF PREFERRED EMBODIMENTS

According to various aspects of the present invention as illustrated in FIGS. 1 to 12, there is provided an improved electrical connector 100, electrical connector assembly and photovoltaic system which will now be described. It will be appreciated that these figures illustrate the general principles of the structures and construction, and that the invention is not limited to the precise configurations illustrated.

The improvement electrical connector 100 is configured to be used in electrical systems to connect electrical cables associated with different components together to form a circuit.

In some preferred configurations, the improved electrical connector 100 is configured to be used in a photovoltaic (PV) system for connecting PV modules (photovoltaic panels, solar shingles and the like).

In some configurations, the PV modules 1 can be installed on a Building Integrated Photovoltaic ("BIPV") roofing, cladding or siding system/product. In these configurations, solar cells are integrated with the roofing, cladding, siding or other product.

It is anticipated that the improved electrical connector may be used for other electrical applications.

In the preferred configurations, the improved electrical connector 100 has an electrical connector 110 and a collar 150.

Figure 1:
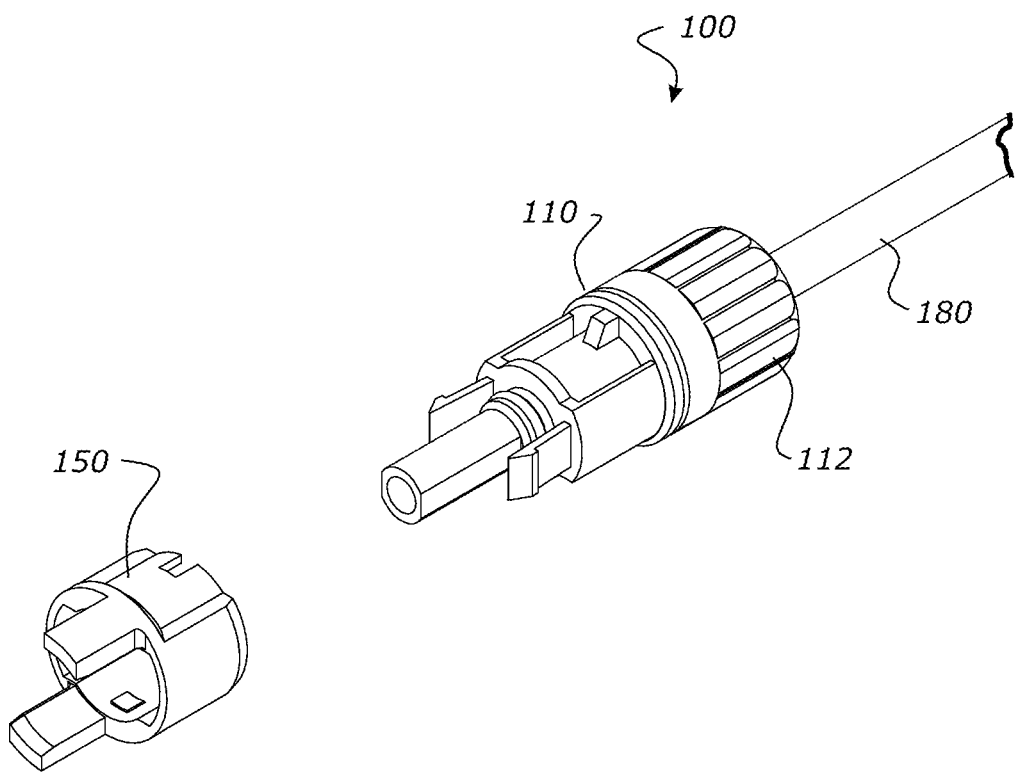
FIG. 1 shows a perspective view of an improved electrical connector including an electrical connector and collar.
Figure 8:
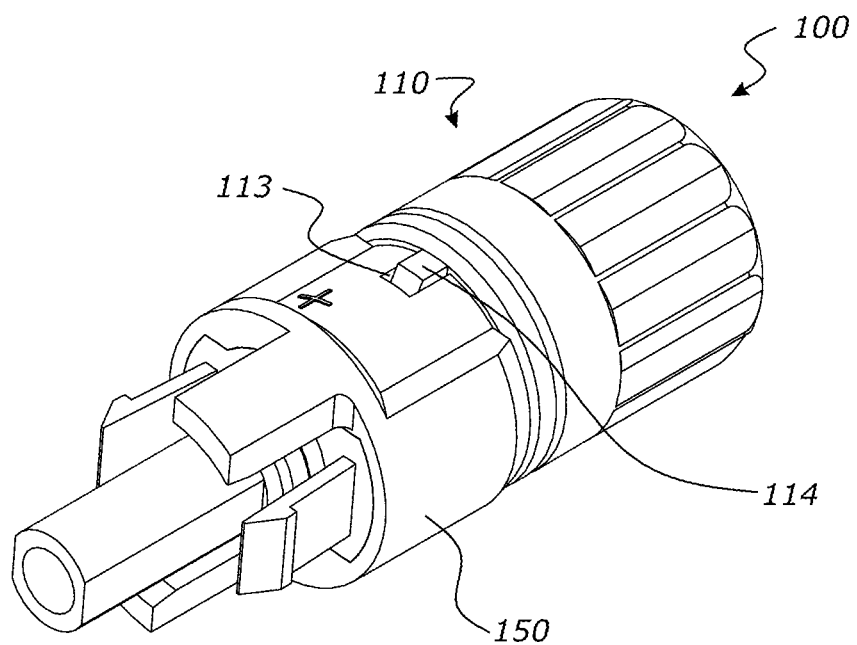
FIG. 8 shows a perspective view of the improved electrical connector.

The collar physically prevents incorrect mating with another component (in a PV system), as shown in FIG. 1 (collar removed) and FIG. 8 (collar attached). Preferably, the collar 150 has physical features which predetermine connections which can be made with the electrical connector.

The collar 150 physically prevents incorrect mating by obstructing full and complete connection of components (e.g. corresponding male and female connectors), which would otherwise be able to form physical and electrical connections. The collar physically prevents the improved electrical connectors from being transposed in an electrical system. Incorrect mating can be understood to mean incorrect or at least less desired connection between components.

In the preferred configurations, the collar 150 prevents connection of corresponding electrical connectors which would electrically connect but for obstructing features provided by the collar. In the most preferred configurations, the electrical connector 110 is a male or female connector configured to coaxially connect with a corresponding electrical connector being the other of the male or female connector (e.g. male connector configured to connect with a female connector and vice versa).

In the most preferred configurations, the incorrect mating which the collar 150 prevents is connection of components associated with different electrical polarity. I.e. a positive "+" connector is prevented from connecting with a negative "−" connector. Only connectors with like/the same electrical polarity (i.e. negative-and-negative or positive-and-positive) can be connected together and not obstructed by features of the collar.

Examples of potential connection errors includes:

a) connecting the positive and negative connectors of the same PV module together resulting in the entire array to be short circuited; or b) connecting the positive and negative connectors of different PV modules together, possibly resulting in incorrect voltages by connecting groups of modules in series.

In the preferred configurations, the collar 150 prevents incorrect connection between single pole connectors. Single pole connectors may be particularly useful in applications of low voltage and high current.

In electrical systems where male and female pole connectors are used (such in PV systems where QC4 connectors or the like are used), modules/components may be connected together in either series or parallel. In some configurations, only parallel connections between modules are intended (in these configurations, series connections are made internally within each module, and external cable connections between modules are intended to be of a common single polarity i.e. in parallel).

The improved electrical connectors 100, preferably physically (and/or otherwise) prevent a connection in series (the incorrect/unintended connection) and only permit connection in parallel (the correct/intended connection). In these configurations, an electrical connector which inherently could be used to form both a series or parallel connection but for the collar 150, is restricted to only allowing parallel connection (i.e. only connections between common single pole connectors having the same polarity are permitted.)

Typically, installers connect an array of PV modules together on-site. However, connecting and forming correct electrical circuits may be difficult where there are multiple options for joining the electrical components of the PV system together.

Preferably, the important step of connecting the correct collar 150 to the electrical connect occurs at manufacturing (or by a qualified person such as an electrician) at a convenient and/or safe location and time (e.g. before installation at the intended location).

Preferably, correct improved electrical connector 100 (with the intended collar for a positive or negative polarity) are connected to the electrical connector prior art to installation of the modules. Preferably, the correct collars are connected to assign polarity prior to installation on a building as roofing, cladding, siding or the like.

It should be appreciated, the installer or electrician would not need to rely on complex electrical wiring designs to ensure correct connection (where there are different connection possibilities), and instead can be guided by the physical structure of the improved electrical connector 100 and/or visual indicia of the connector (colour). This may be particularly useful where an unskilled or unqualified person such as the installer is completing the final connection between modules.

Figure 6:
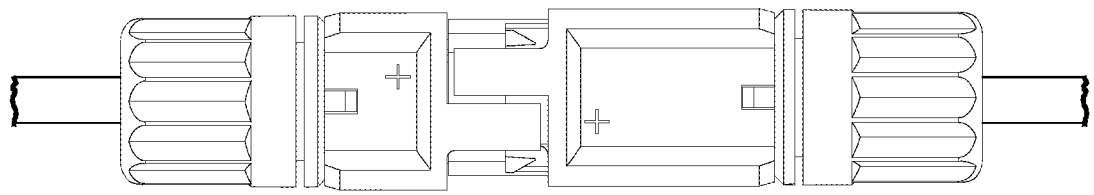
FIG. 6 shows a side view of an electrical connector assembly with male and female connectors associated with the same electrical poles fully connected.
Figure 7:
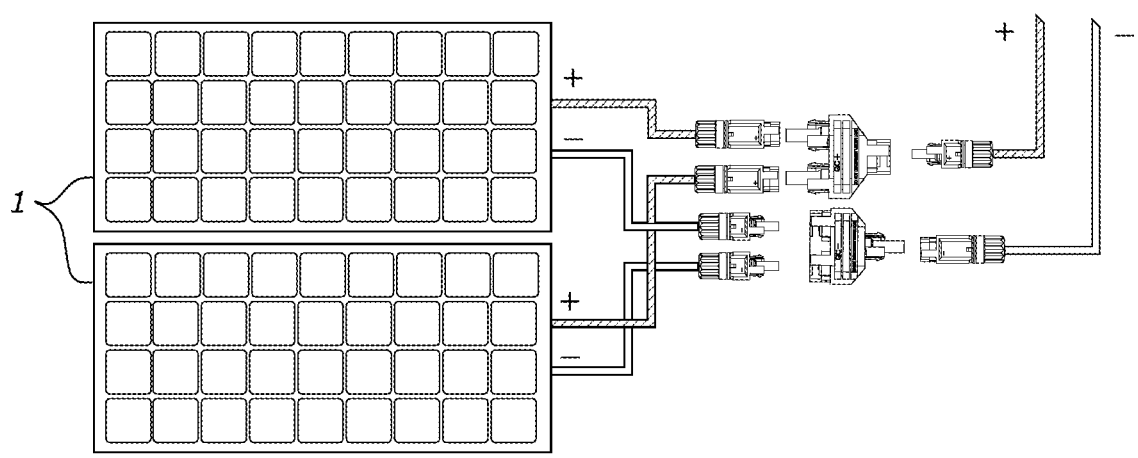
FIG. 7 shows a schematic of a photovoltaic system with PV modules connected in parallel.

FIG. 6 shows a schematic of a PV system using improved electrical connectors 100 to couple photovoltaic modules 1 in parallel. In these configurations, the voltage of these systems is preferably low for safety and/or because of the relatively small size of each module (such as in configurations where the modules are BIPV roofing tiles.)

In some preferred configurations, the improved electrical connectors 100 are used in electrical systems of less than approximately 100 volts. In some configurations, the improved electrical connectors 100 are used in electrical systems of less than 50 volts. A person skilled in the art would appreciate that the improved electrical connectors 100 may be used at different voltage ranges as appropriate such as depending on the jurisdiction and/or method of installation (e.g. may depend on a skill level of person making the connection or the setting the connection is made in.)

It should be appreciated, that the improved electrical connectors 180 may particular useful for connecting BIPV roofing tiles or connecting components in parallel and/or at low voltage (e.g. below approximately 100 volts).

Further, PV modules are typically installed on roofs, or other high, dangerous or hard to reach locations to be exposed to solar energy. Safety of the installers may be compromised if the PV system is difficult to install. The difficulty of the task may be compounded where there is low visibility and/or bad/wet weather.

It should be appreciated that in the preferred configurations, the present invention can improve the ease and/or correct installation of PV modules by helping ensure electrical connectors are connected correctly. The improved ease of connecting components of the PV system together correctly allows low skilled installers (no special skills or qualifications required) to complete the connections of the PV system. The improved electrical connectors can also help minimise the time required to connect the PV system together and/or reduce the likelihood of requiring reinstallation/reconnection of components due to incorrect connections.

Preferably, at least four types of improved electrical connectors 100 are manufactured and available for use in an electrical system: negative-male connector, negative-female connector, positive-male connector and positive-female connector (FIGS. 10A, 10B, 10D, 10E.)

A plurality of electrical connectors 100 can be manufactured being a male or female connector configured to coaxially connect with a corresponding electrical connector being the other of the male or female connector.

Preferably, the polarity of the improved electrical connector is established by coupling either a positive or negative type collar 150 to the electrical connector body 111.

Preferably, during manufacture, a first collar (e.g. associated with a positive polarity) is coupled to a first batch of electrical connectors 110. Coupling a positive collar to a standard electrical connector forms a positive improved electrical connector.

Preferably, during manufacture, a second collar (e.g. associated with a negative polarity) is coupled to a second batch of electrical connectors 110. Coupling a negative collar to a standard electrical connector forms a negative improved electrical connector.

In the preferred configurations, the one or more fingers 152 of the first collar is arranged in different positions to the one or more fingers of the second collar.

Figure 12A:
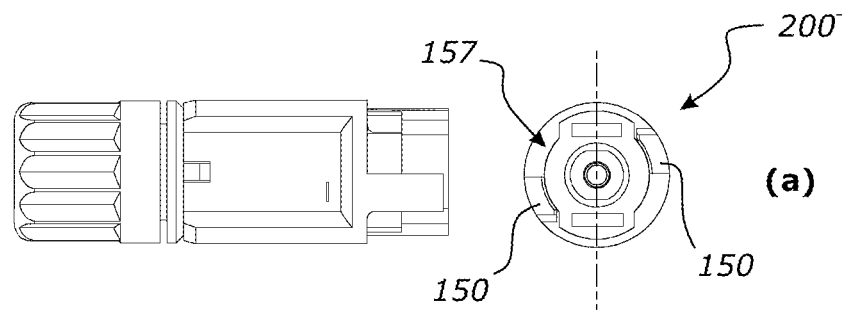
FIG. 12A shows an end view of the negative male improved electrical connector.
Figure 12B:
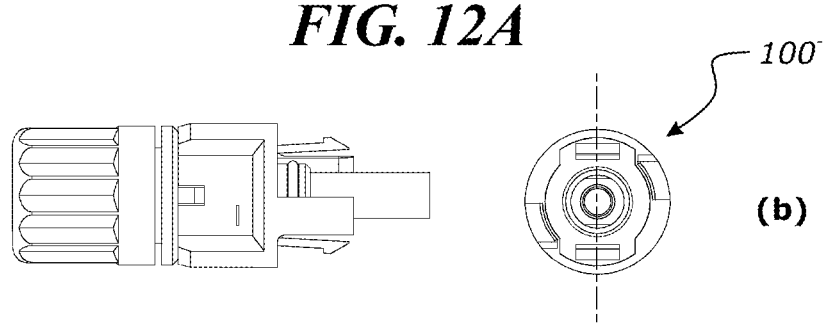
FIG. 12B shows an end view of the negative female improved electrical connector.
Figure 12C:
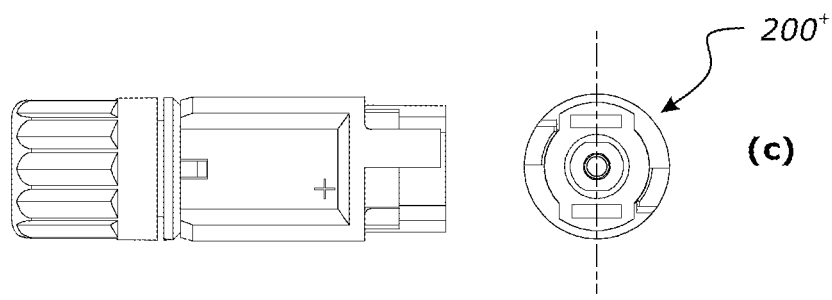
FIG. 12C shows an end view of the positive male improved electrical connector.
Figure 12D:
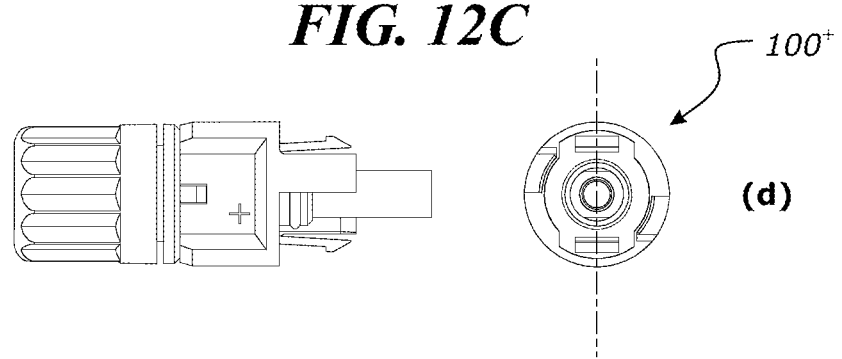
FIG. 12D shows an end view of the positive female improved electrical connector.

In some configurations, the one or more fingers of the first collar is arranged as a geometrical reflection of the one or more fingers of the second collar (e.g. FIG. 12A vs 12C, and FIG. 12B vs 12D).

Each type of electrical connector (female 100, male 200, Y-shaped 300 etc. connector) is manufactured as the same component whether the electrical connector is to be associated with a positive or negative polarity. To differentiate a positive "+" improved electrical connector from a negative "−" improved electrical connector, the collar 150 coupled to the electrical connector 110 is different.

The features associated with the male improved electrical connectors 200 are the same or similar to the ones described for female improved electrical connectors 100. Similar features are therefore generally indicated by similar numerals but indicated with a number in the 200s rather than the 100s.

It should be appreciated collars 150, 250 separately manufactured from the electrical connectors can provide advantages such as efficiency, simplicity and cost-savings during manufacturing and quality control.

PV electrical connectors require inspection/testing for quality control to check if the product requirements are met to ensure it functions as intended and are safe to use. PV electrical connectors are intended to connect cables to transport power in harsh conditions including being exposed to sun, rain and wind.

In the preferred configurations, the solution of identifying connectors (i.e. the collar) is coupled after the electrical connector 110 (e.g. QC4 connector) is manufactured. Quality control can be performed on the electrical connectors 110, before the collar 150 is attached. Therefore, the process of manufacturing and testing electrical connectors for positive and negative polarity use is simplified. Different process lines for positive and negative electrical connectors 110 is not required, as the electrical connector first manufactured and the polarity identifying collar is attached after manufacture and testing.

The improved electrical connector has advantages including not requiring processes and quality control for different electrical connector 110 polarities which can significantly improve efficiency, simplicity and cost of manufacturing and testing the electrical connectors, while also providing an improved electrical connector capable of physically preventing incorrect mating with other components in the PV system.

In the preferred configurations, the electrical connector 110 has an electrical connector body 111. In the illustrated configurations, the electrical connector body 111 is substantially cylindrical.

In the preferred configurations, the collar 150 circumferentially surrounds an external surface of the electrical connector 110. The collar 150 has a collar body 151 being substantially hollow to receive at least a portion of the electrical connector body 111. Preferably, the collar 150 has open ends, to pass over the electrical connector body 111.

Preferably, the electrical connector 110 is a photovoltaic connector for components of a PV system together. The improved electrical connectors 100 couple one or more photovoltaic modules 1 to another component of the photovoltaic system via electrical cables 2.

The improved electrical connectors 100 couple PV modules together and/or to other components (e.g. junction box 3, solar charge controller, etc.) to transport electrical power. Physical and electrical connection is typically established as male and female connectors are coupled together.

In the most preferred configurations, the electrical connector 110 is a co-axial connector configured to connect with a corresponding electrical connector in an insertion direction (arrows shown in FIGS. 4 and 5) parallel to the longitudinal axis (L) of the connectors. Typically, a male electrical connector is configured to connect with a corresponding female electrical connector.

The electrical connector 110 may be male or female, a Y connector, T connector or straight connector. Some examples illustrated in FIGS. 10A-F.

Figure 3:
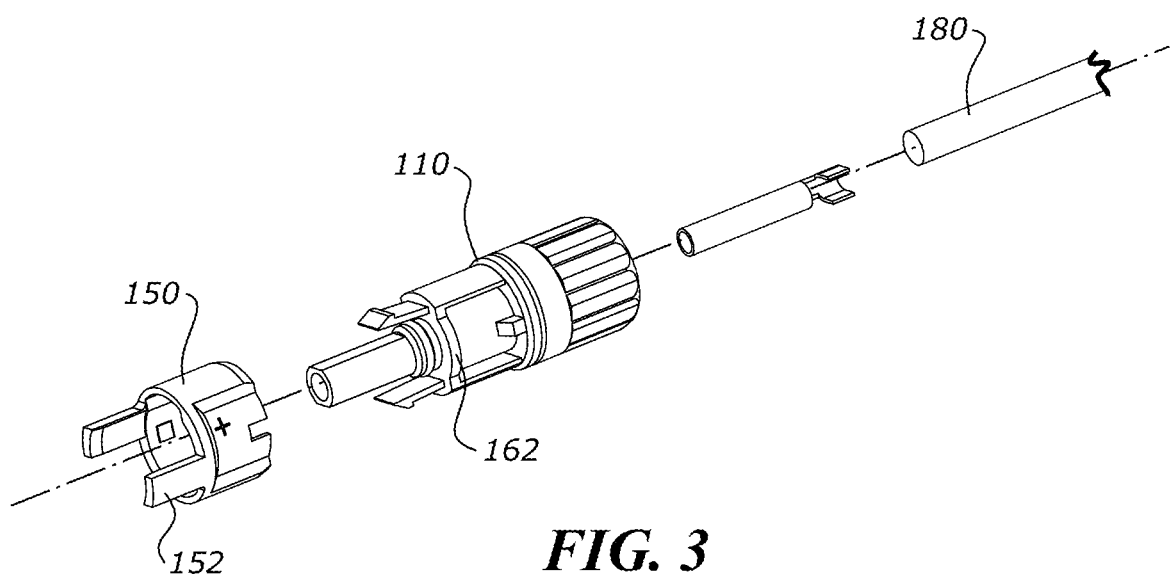
FIG. 3 shows an exploded view of the improved electrical connector.

In the most preferred configurations, the photovoltaic connector is a QC4 connector, as best shown in FIGS. 1 and 3. The QC4 connector is a single contact, single polarity electrical connector used in PV systems to connect components.

It is anticipated, the improved electrical connector can be made to replace or be adapted from other standard electrical connectors known to a person skilled in the art. For example, MC4, PV4, H4 connectors and the like.

In the preferred configurations, the collar 150 is an additional/separate component provided onto an electrical connector 110. Preferably, the improved electrical connector 100 comprises a locking engagement feature 160 for coupling the collar 150 onto the electrical connector 110, as referenced in FIG. 9 (described in more detail below).

In some configurations, the collar 150 is removably attached to the electrical connector body 111.

In other configurations, the collar 150 is adapted to be irremovably attached to the electrical connector body 111. In these configurations, the collar 150 is difficult or not possible to disconnect from the connector body 111 without damaging the collar and/or electrical connector, or it is not possible to disconnect without a tool (i.e. not separable by hand). It should be appreciated in these configurations, a permanent/semi-permanent collar 150 improves safety as the intended use of the connectors cannot be/cannot easily be altered after manufacture.

In a PV system, a range of different improved electrical connectors may be used to connect PV components together to form the intended electrical circuit. A range of different improved electrical connectors are shown in FIGS. 10A-F.

The improved electrical connectors shown on the left (FIGS. 10A-C) are may be used as negative electric connectors i.e. electrical connectors associated with and/or connected at/to/from the negative polarity of a component in the PV system.

The improved electrical connectors shown on the right (FIGS. 10D-F) are may be used as positive electronic connectors i.e. electrical connectors associated with and/or connected at/to/from the positive polarity of a component in the PV system.

It should be appreciated that within a PV system, the same types of PV connectors can be used to connect different components together. However, connectors associated with different polarity within a PV system is preferably identifiable and correctly connected to form the correct/intended electrical circuit (example partial circuit shown in FIG. 6).

Separate and different collars 150, 250 associated with different polarity and coupled onto to the electrical connectors is an effective way of differentiating different polarity connectors.

The collar 150 can be coupled to the electrical connector 110 by one or more of the following: snap-fit, press-fit, screw-on, rotate and lock, adhesion, welding or the like.

Preferably, the collar 150 is coupled to the electrical connector 110 during manufacturing of the improved electrical connector. Alternatively, the collar 150 is a separate component which can be coupled onto the connector at a later stage.

In some configurations, coupling of the collar 150 and the electrical connector 110 forms an audible click which provides positive feedback to confirm complete/full coupling has been fully made.

In some other configurations, the collar 150 is integrated with the electrical connector 110 as a single component during manufacture.

In the preferred configurations, the collar 150 comprises a rigid or semi-rigid material. It should be appreciated that the collar can increase the strength of the electrical connectors 110 and/or protect the connectors from damage such as from physical contact or weathering due to solar/wind/rain exposure.

In some configurations, the collar 150 is formed from a hard plastic such as PPE, PA, PC, PBT etc. It is anticipated other materials known by a person skilled in the art may be used with the desired physical properties.

Figure 2:
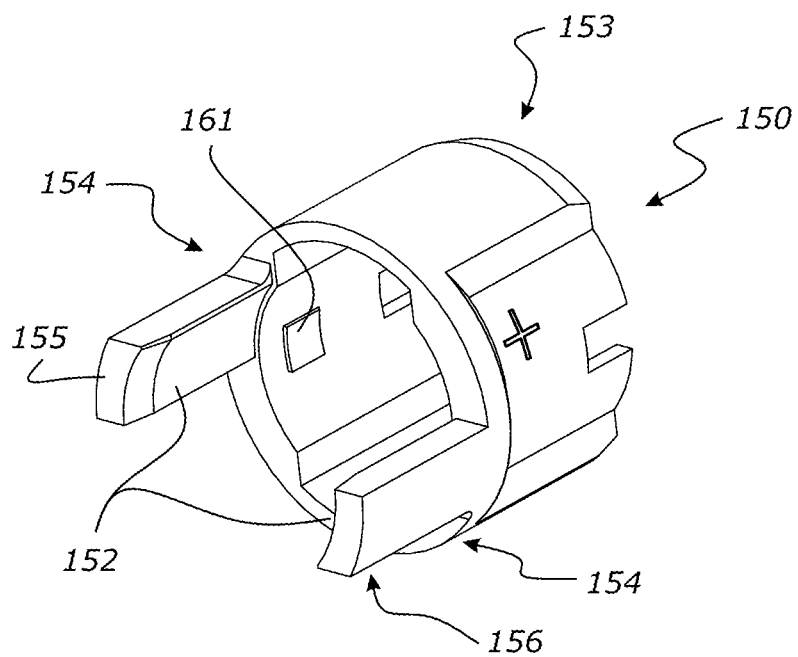
FIG. 2 shows a perspective view of the collar.

In the preferred configurations the collar 150 as best shown in FIG. 2 comprises one or more fingers 152 extending from a free end 154 of the collar body 151 configured to physically prevent incorrect mating with another component.

The collar body 151 has a cable end 153 and a free end 152. The cable end 153 of the collar is configured to be located at or towards a gland nut 112 of the electrical connector 110. The free end 152 of the collar is located towards the free and/or engaging end of the connector (i.e. the end of the connector for engaging with a corresponding component). The one or more fingers 152 of the collar extends from the free end 154 and are configured to obstruct full and complete connection with another component where connection would be undesirable/incorrect for forming the electrical circuit.

Preferably, the one or more fingers comprises an interference surface 155 configured to block incorrect mating with another component. The interference surface 155 (referenced in FIGS. 2 and 4) is configured to engage with another component to obstruct full connection. The interference surface 155 is located at a free end 156 of the finger.

In the preferred configurations, the collar 150 prevents connection of corresponding electrical connectors which would electrically connect but for the one or more fingers 152 obstructing complete/full insertion.

In the illustrated configurations, the incorrect mating the collar 150 prevents is connection of components associated with different electrical polarity (i.e. components with positive with negative polarity are prevented from being connected together).

Figure 4:
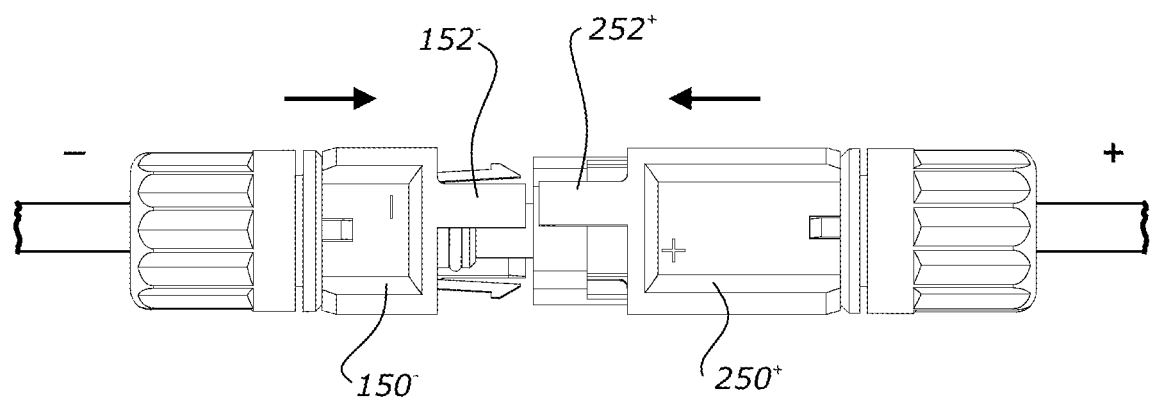
FIG. 4 shows a side view of an electrical connector assembly with male and female connectors associated with different electrical poles.

For example, as shown in FIG. 4, electrical connectors (internal component without the collar) are corresponding connectors configured to be fully and electrically connectable (i.e. they are female and male QC4 connectors). However, the female connector has a negative collar 150− and the male connector has a positive collar 250+ to prevent connection.

In contrast, the female and male corresponding connectors shown in FIG. 6 are allowed to (not obstructed by the one or more fingers 152) form a full and complete connection, as they are improved electrical connectors associated with the same polarity (both associated with positive polarity).

In an electrical connector assembly, preferably, the female and male electrical connectors are co-axial corresponding electrical connectors configured to electrically connect upon complete insertion. The insertion direction (shown as arrows in FIG. 5) being parallel to the longitudinal axis of the connectors.

In the preferred configurations, the one or more fingers 152 extends substantially longitudinally from the collar body 151

The electrical connector 110 comprises an insertion direction for co-axially mating with a corresponding electrical connector. Preferably, the one or more fingers 152 extends substantially parallel the insertion direction (arrows in FIGS. 4 and 5).

In some configurations, the one or more fingers 152 has a substantially rectangular profile when viewed from a side of the collar (as shown in FIG. 4).

It is anticipated that the one or more fingers 152 may take the form of other profile/shapes which engage and obstruct incorrect/undesirable full and complete connection with a corresponding component. For example, the one or more fingers 152 may have a square, triangular, tooth/jagged, waved profile which obstructs or otherwise interferes with incorrect connection.

As described above, preferably, the one or more fingers 152 are arranged on the collar 150 to physically allow connection or prevent incorrect mating with another corresponding component.

The collar 150 of each improved electrical connector 100 comprises one or more fingers in one of the following arrangements:

a) arranged to allow the corresponding male and female electrical connectors to make full and complete connection upon insertion; or b) arranged to obstruct full and complete insertion of the corresponding male and female electrical connectors, the corresponding electrical connectors capable of making full and complete connection but for the one or more fingers.

To align the electrical connectors 110 with a corresponding electrical connector in at least one natural connection orientation, preferably the electrical connector comprises one or more registration features 115, 116 (referenced in FIG. 10A).

The natural connection orientation can be defined as the orientation required for the electrical connector to align and connect with a corresponding connector. For connectors with two orders of symmetry (as illustrated best shown in FIG. 12), the connector has two natural connection orientations (at 0 and 180°).

The electrical connector 110 comprises one or more registration features 115, 116 configure to align the electrical connector with a corresponding electrical connector in at least one natural connection orientation.

In some configurations, one of the registration features is the profile of the connecting protrusion 115 of the connector and/or the receiving channel of the corresponding connector, as referenced in FIG. 10A. The profile of the connecting protrusion 115 has a limited order of rotational symmetry (not unlimited like a circle). In the illustrated configuration, the connecting protrusion 115 has two orders of rotational symmetry.

In some configurations, one of the registration features is supplementary corresponding features (e.g. slots 116 and protrusions) on the corresponding connectors to align the connectors in the natural connection orientation, as referenced in FIG. 10B.

Preferably, the female electrical connector 100 is non-rotatable with respect to the male electrical connector 200 (once the connectors are connected together).

Preferably, the collar 150 is also non-rotatable with respect to the electrical connector body 111. This helps ensure the one or more fingers interact (obstruct or pass by other fingers) as desired/anticipated upon aligning the corresponding connectors together for connection.

In the preferred configurations, the one or more fingers 152 are arranged at or about a perimeter of the collar 150 at discrete positions (preferably not a continuous protrusion).

In the preferred configurations, the collar 150 has two or more fingers 152. In the illustrated configuration, the collar 150 has two fingers 152 to physically prevent incorrect mating.

In configurations, with two or more fingers 152, preferably the fingers are arranged evenly around the perimeter of the collar 150. In the illustrated configuration, the collar 150 has two fingers 152 arranged 180° apart.

Preferably, the one or more fingers 152 are offset from 0 and 180° in an end view in the natural connection orientation.

Upon connection, where the female and male electrical connectors 100, 200 are corresponding electrical connectors and are associated with different electrical polarity, preferably the connectors are prevented/obstructed from making a full and complete connection.

At least one of the one or more fingers 152 of the corresponding female and/or male electrical connectors obstruct complete insertion of the electrical connectors when the free ends 154 of the connectors are pushed together.

Preferably at least one of the one or more fingers 152– of the female electrical connector (shown as positive connector in FIG. 4) abuts at least one of the one or more fingers 252+ of the corresponding male electrical connector (shown as negative connector in FIG. 4) to prevent complete insertion of the electrical connectors.

The one or more fingers 152, 252 are arranged such that when the engaging ends of the male and female connectors are brought to face together, the fingers are configured obstruct full connection.

To achieve this, in the preferred configurations, the one or more fingers 152 of the female connector are arranged such that at least one of the one or more fingers of the female connector align in the insertion direction with at least one of the one or more fingers 252 of the male connector to physically obstruct full connection upon insertion and vice versa (as shown in FIG. 4).

Preferably, the one or more fingers 152 of the female connector are arranged such they are offset around the perimeter of collar 150 to the fingers of the male corresponding connector of a different polarity and vice versa when viewed from an end view (e.g. connectors of FIG. 12A vs 12D, FIG. 12B vs 12C).

In some configurations, such as connectors associated with different polarity, the one or more fingers of the female electrical connector (e.g. FIG. 12B) is arranged as a geometrical reflection of the one or more fingers of the corresponding male electrical connector (e.g. FIG. 12BC).

In the illustrated configuration, the one or more fingers 152 of the female connector are offset by approximately 45° to 90° to the fingers 252 of the male of a different polarity corresponding connector (as best shown in FIG. 12A vs 12D and 12B vs 12C).

Upon connection, where the female and male electrical connectors are corresponding electrical connectors and are associated with the same electrical polarity, preferably the connectors are allowed to make full and complete connection. I.e. same electrical polarities are not obstructed from making complete connection.

Figure 5:
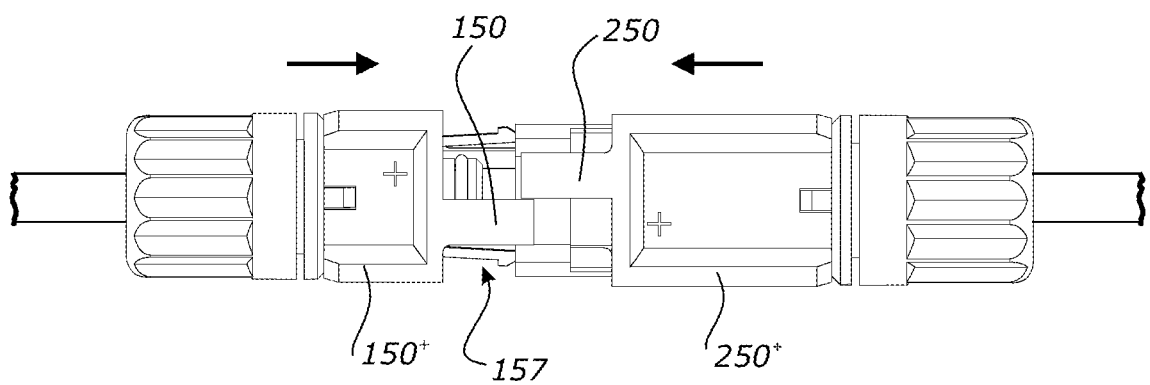
FIG. 5 shows a side view of an electrical connector assembly with male and female connectors associated with the same electrical poles.

In these configurations, the one of the one or more fingers 152 of the female electrical connector and corresponding male electrical connector do not engage and the electrical connectors can complete insertion when the free ends of the connectors are pushed together (FIGS. 5 & 6).

In some configurations, to achieve this, the one or more fingers 152 of the female electrical connector are arranged in the same positions around the perimeter of the collar to the one of the one or more fingers of the collar of the corresponding male of the same polarity electrical connector when viewed from an end view (as shown in FIG. 12A vs 12B and 12C vs 12D).

Preferably, there is a gap or opening 157 between the fingers 152 of the collar 150, as referenced in FIGS. 12 and 5. The gap 157 is arranged around the perimeter of the collar 150.

As shown in FIG. 5, the gap 157 is configured to allow fingers 252 of a corresponding collar 250 to pass into the open region, to allow full/complete connection of corresponding connectors which are intended for connection (e.g. corresponding connectors with the same polarity).

In the preferred configurations, the collar 150 further comprises one or more visual indicia to indicate positive or negative charge, the visual indicia being colour, marking and/or shape.

In the most preferred configurations, the polarity of the improved electrical connector 100 can be identified by the colour of the collar 150. The colour of a collar 150 associated with a positive charge should be clearly differentiated from the colour of a collar associated with a negative charge. For example, a collar 150 associated with a positive charge is red/orange while a collar 150 associated with a negative charge is blue/black. The different in colour or other visual indicia is indicated by the different patterns on the collars as shown in FIGS. 10 and 11. The collars associated with a negative charge have a spotted pattern, while the collars associated with a positive charge are visually distinct having a stripped pattern.

The clear visual indicia (preferably colour), can help installers identify which connectors should be connected together. This can be the first indication for which connectors to connect together (visual), while the one or more fingers 152 (physical obstruction) is another/back-stop protection against incorrect/incorrect mating coupling of corresponding electrical connectors.

It should be appreciated, that these two features work in synergy to provide a dual-protection system against incorrect connections in an electrical circuit in a PV system. Again, this helps improve the ease of connecting components of the PV system minimising the time required to connect the PV system together, reducing the likelihood of incorrect connections requiring reinstallation, and/or allowing low skilled installers to complete the electrical connections rather than qualified/specialist PV electricians.

Figure 9:
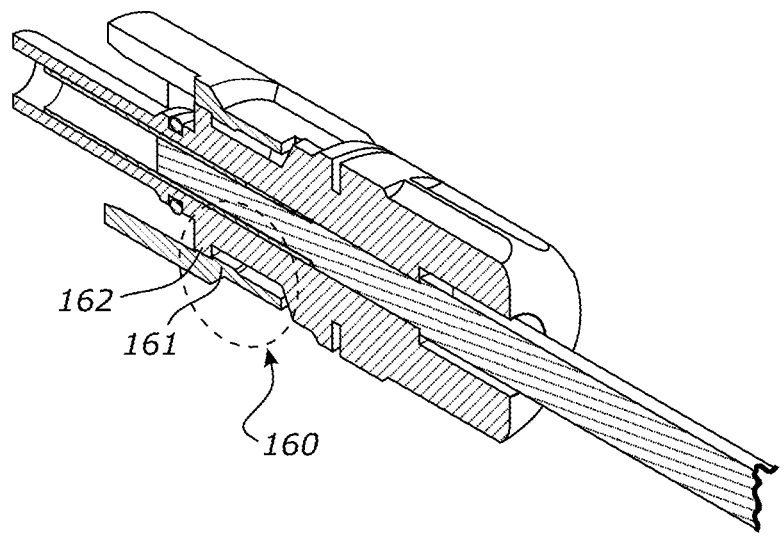
FIG. 9 shows a longitudinal cross-section view of the improved electrical connector.
Figure 11A:
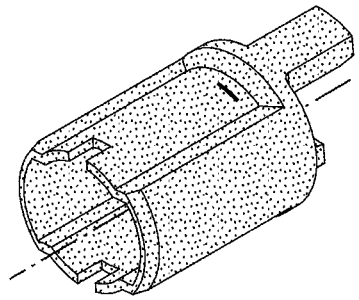
FIG. 11A shows a perspective view of a collar for the negative female improved electrical connector.
Figure 11D:
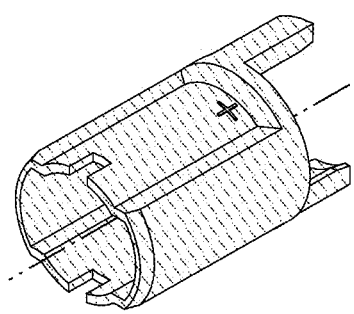
FIG. 11D shows a perspective view of a collar for the positive male improved electrical connector.
Figure 11B:
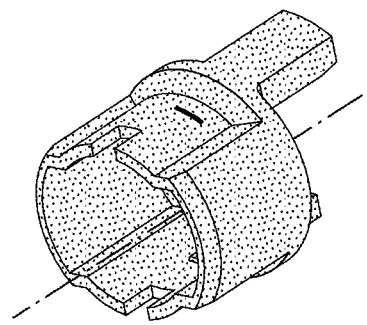
FIG. 11B shows a perspective view of a collar for the negative female improved electrical connector.
Figure 11E:
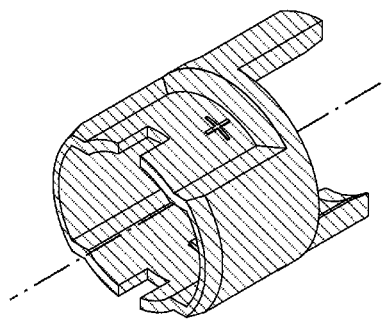
FIG. 11E shows a perspective view of a collar for the positive female improved electrical connector.
Figure 11C:
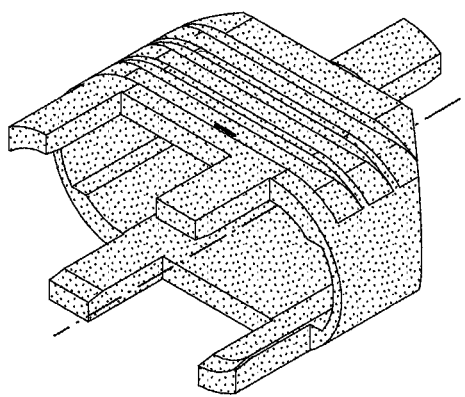
FIG. 11C shows a perspective view of a collar for the negative Y-shaped improved electrical connector.
Figure 11F:
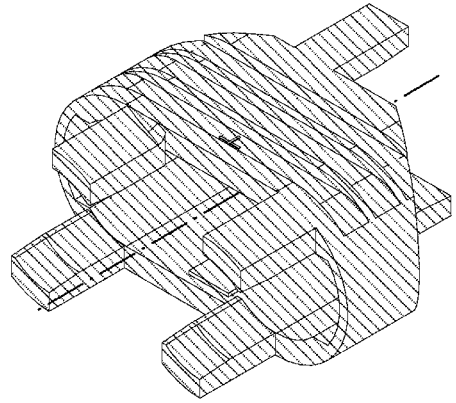
FIG. 11F shows a perspective view of a collar for the positive Y-shaped improved electrical connector.

The improved electrical connector 100 comprises a locking engagement feature 160 for coupling the collar 150 onto the electrical connector 110, as referenced in FIG. 9. The locking engagement feature 160 helps keep the collar 150 on the electrical connector 110, once the components are coupled together to form of the improved electrical connector 100.

Preferably, the locking engagement feature 160 makes it more difficult to remove the collar 100 from the electrical connector 110.

In some configurations, the engagement feature includes a tab 161 on the inner surface of the collar body (as illustrated in FIG. 2). Alternatively, the tab 160 is located on the outer surface of the electrical connector body 110 (not illustrated).

In the preferred configurations, the inner surface of the collar body (where the tab is located on the electrical connector body) or the outer surface of the electrical connector body (where the tab is located on the inner surface of the collar as illustrated) comprises a lip 162 configured to engage with the tab to prevent disengaging of the collar from the electrical connector (as referenced in FIGS. 2 & 9).

In the preferred configurations, the tab 161 is a ramp configured to promote insertion of the collar 150 onto the electrical connector 110 in one direction and prevent disengaging of the collar from the electrical connector in the opposite direction. Preferably, the ramp tab 161 ramps downwardly towards a cable end of the electrical connector.

To align the collar 150 in the correct orientation onto the electrical connector 110, the improved electrical connector has one or more aligning features. The aligning help orientate the collar 150 the correct predefined orientation. Predefined orientations of the collar help ensure the one or more fingers 152 are located to function as physical interference against incorrect connections.

In the preferred configurations, the collar body 151 comprises an internal cut-out substantially along the length of the collar body complimentary to the profile of the external surface of the electrical connector body for alignment of the collar onto the electrical connector, as shown in FIGS. 12 A-D.

In some configurations, the collar body 151 and/or the electric connector body 111 comprises supplementary alignment elements to align the components together.

In one configuration, the supplementary alignment elements are a slot 113 and protrusion 114, as referenced in FIG. 8.

To those skilled in the art to which the invention relates, many changes in construction and widely differing embodiments and applications of the invention will suggest themselves without departing from the scope of the invention as defined in the appended claims.

This invention may also be said broadly to consist in the parts, elements and features referred to or indicated in the specification of the application, individually or collectively, and any or all combinations of any two or more of said parts, elements or features, and where specific integers are mentioned herein which have known equivalents in the art to which this invention relates, such known equivalents are deemed to be incorporated herein as if individually set forth.

The invention claimed is:

1. An improved electrical connector comprising:
   an electrical connector having an electrical connector body and one or more registration features configured to align the electrical connector with a corresponding electrical connector in at least one natural connection orientation; and
   a collar circumferentially surrounding an external surface of the electrical connector; and
   wherein the collar comprises:
   a collar body being substantially hollow configured to receive at least a portion of the electrical connector body, the collar body having a cable end and a free end;
   one or more fingers integrally formed with the collar, extending from the free end of the collar body, and arranged at or about a perimeter of the collar at discrete positions, the one or more fingers configured to physically prevent incorrect mating with another corresponding component associated with different electrical polarity.

2. The improved electrical connector as claimed in claim 1 wherein the collar prevents connection of corresponding electrical connectors which would electrically connect but for the one or more fingers obstructing complete insertion.

3. The improved electrical connector as claimed in claim 1 wherein the one or more fingers comprises an interference surface configured to block incorrect mating with another component.

4. The improved electrical connector as claimed in claim 3 wherein the interference surface is located at a free end of the finger.

5. The improved electrical connector as claimed in claim 1 wherein the electrical connector comprises an insertion direction for co-axially mating with a corresponding electrical connector and the one or more fingers extends substantially parallel the insertion direction.

6. The improved electrical connector as claimed in claim 1 wherein the collar is non-rotatable with respect to the electrical connector body.

7. The improved electrical connector as claimed in claim 1 wherein the one or more fingers has a substantially rectangular profile when viewed from a side of the collar.

8. The improved electrical connector as claimed in claim 1 wherein the collar further comprises one or more visual indicia to indicate positive or negative charge, the visual indicia being colour, marking and/or shape.

9. The improved electrical connector as claimed in claim 1 wherein the collar body and/or the electric connector body comprises supplementary alignment elements to align the components together, the supplementary alignment elements are a slot and protrusion.

10. The improved electrical connector as claimed in claim 1 further comprising a locking engagement feature for coupling the collar onto the electrical connector.

11. The improved electrical connector as claimed in claim 10 wherein the engagement feature comprises a tab on the inner surface of the collar body or the outer surface of the electrical connector body, the tab is a ramp configured to promote insertion of the collar onto the electrical connector in one direction and prevent disengaging of the collar from the electrical connector in the opposite direction.

12. The improved electrical connector as claimed in claim 1 wherein the collar comprises a rigid or semi-rigid material.

13. The improved electrical connector as claimed in claim 1 wherein the collar is a separate component to the electrical connector.

14. The improved electrical connector as claimed in claim 13 wherein the collar is removable from the electrical connector.

15. The improved electrical connector as claimed in claim 1 wherein the electrical connector is a photovoltaic connector.

16. The improved electrical connector as claimed in claim 15 wherein the photovoltaic connector is a QC4 connector.

17. The improved electrical connector as claimed in claim 1 wherein the electrical connector is a single pole connector.

18. The improved electrical connector as claimed in claim 1 wherein the collar prevents the improved electrical connector forming a connection in series and permits a connector forming a connection in parallel.

19. An electrical connector assembly comprising:
a female electrical connector; and
a male electrical connector;
wherein both the female and male electrical connectors are improved electrical connectors as claimed in claim 1; and
wherein the female and male electrical connectors are co-axial corresponding electrical connectors configured to electrically connect upon complete insertion.

20. The electrical connector assembly as claimed in claim 19 wherein the collar of each improved electrical connector comprises one or more fingers in one of the following arrangements:
a) arranged to allow the corresponding male and female electrical connectors to make full and complete connection upon insertion; or
b) arranged to obstruct full and complete insertion of the corresponding male and female electrical connectors, the corresponding electrical connectors capable of making full and complete connection but for the one or more fingers.

21. The electrical connector assembly as claimed in claim 20 wherein the one or more fingers of the female connector are arranged such that at least one of the one or more fingers of the female connector align in the insertion direction with at least one of the one or more fingers of the male connector to physically obstruct full connection upon insertion and vice versa.

22. The electrical connector assembly as claimed in claim 21 wherein at least one of the one or more fingers of the corresponding female and/or male electrical connectors obstruct complete insertion of the electrical connectors when the free ends of the connectors are pushed together and at least one of the one or more fingers of the female electrical connector abuts at least one of the one or more fingers of the corresponding male electrical connector to prevent complete insertion of the electrical connectors.

23. The electrical connector assembly as claimed in claim 20 wherein the female and male electrical connectors are associated with different electrical poles.

24. The electrical connector assembly as claimed in claim 19 wherein the collar of the one or more fingers of the female electrical connector is located in different positions around the perimeter of the collar to the one of the one or more fingers of the collar of the corresponding male electrical connector.

25. The electrical connector assembly as claimed in claim 24 wherein the one or more fingers of the female electrical connector is arranged as a geometrical reflection of the one or more fingers of the corresponding male electrical connector.

26. The electrical connector assembly as claimed in claim 25 wherein the one of the one or more fingers of the female electrical connector and corresponding male electrical connector do not engage and the electrical connectors can complete insertion when the free ends of the connectors are pushed together.

27. The electrical connector assembly as claimed in claim 24 wherein the female and male electrical connectors are associated with the same electrical pole.

28. A photovoltaic system comprising:
one or more photovoltaic modules;
one or more improved electrical connectors as claimed in claim 1 to couple the one or more photovoltaic modules to another component of the photovoltaic system via electrical cables,
wherein the component the photovoltaic cell is connected to is one or more of the following components:
a) another photovoltaic module;
b) junction box;
c) solar charge controller.

29. An improved electrical connector comprising:
an electrical connector being a male or female connector configured to coaxially connect with a corresponding electrical connector being the other of the male or female connector, the electrical connector having an electrical connector body and one or more registration features configured to align the electrical connector with a corresponding electrical connector in at least one natural connection orientation; and
a collar circumferentially surrounding an external surface of the electrical connector;
wherein the collar comprises:
a collar body being substantially hollow configured to receive at least a portion of the electrical connector body, the collar body having a cable end and a free end; and
one or more fingers integrally formed with the collar, extending from the free end of the collar body, and at or about a perimeter of the collar at discrete positions, the one or more fingers configured arranged to allow connection with the corresponding electrical connector associated with same electrical polarity and physically prevent incorrect mating with the corresponding electrical connector associated with different electrical polarity.

30. An electrical connector assembly comprising:
a female electrical connector having a female natural connection orientation; and
a male electrical connector having a male natural connection orientation;
the female and male electrical connectors are co-axial corresponding electrical connectors configured to electrically connect upon complete insertion in the natural connection orientations;
each electrical connector comprising an electrical connector body and one or more registration features configured to align the female electrical connector with the male electrical connector in the female and male natural connection orientations;
each electrical connector comprising a collar circumferentially surrounding an external surface of the electrical connector, the collar fixed and non-rotatable in relation to an electrical connector body;

the collar comprises one or more fingers integrally formed with the collar, extending from a collar body, and at or about a perimeter of the collar at discrete positions, the one or more fingers configured arranged to allow connection with the corresponding electrical connector associated with same electrical polarity and physically prevent incorrect mating with the corresponding electrical connector associated with different electrical polarity.

31. A method of manufacturing a plurality of improved electrical connectors comprising:

manufacturing a plurality of electrical connectors being a male or female connector configured to coaxially connect with a corresponding electrical connector being the other of the male or female connector, the electrical connector having an electrical connector body and one or more registration features configured to align the electrical connector with a corresponding electrical connector in at least one natural connection orientation; and coupling a first collar to a first batch of electrical connectors, the first collar comprising a collar body being substantially hollow configured to receive at least a portion of the electrical connector and one or more fingers integrally formed with the collar and arranged at or about a perimeter of the collar at discrete positions, the one or more fingers configured to physically allow connection with the corresponding electrical connector associated with same electrical polarity and physically prevent incorrect mating with the corresponding electrical connector associated with different electrical polarity.

32. The method of manufacturing a plurality of improved electrical connectors as claimed in claim 31 further comprising coupling a second collar to a second batch of electrical connectors, the second collar comprising a collar body being substantially hollow configured to receive at least a portion of the electrical connector and one or more fingers configured to physically prevent or allow or prevent physical connection with the corresponding electrical connector.

33. The method of manufacturing a plurality of improved electrical connectors as claimed in claim 31 wherein the improved electrical connectors are improved electrical connectors as claimed in claim 1.

34. The method of manufacturing a plurality of improved electrical connectors as claimed in claim 33 wherein the one or more fingers of the first collar is arranged in different positions to the one or more fingers of the second collar.

35. The method of manufacturing a plurality of improved electrical connectors as claimed in claim 34 wherein the one or more fingers of the first collar is arranged as a geometrical reflection of the one or more fingers of the second collar.

36. The method of manufacturing a plurality of improved electrical connectors as claimed in claim 31 wherein the first collar is associated with a positive polarity, and the second collar is associated with a negative polarity.

* * * * *

UNITED STATES PATENT AND TRADEMARK OFFICE
CERTIFICATE OF CORRECTION

PATENT NO. : 11,715,908 B2
APPLICATION NO. : 17/130525
DATED : August 1, 2023
INVENTOR(S) : Andrew Leo Haynes et al.

It is certified that error appears in the above-identified patent and that said Letters Patent is hereby corrected as shown below:

In the Claims

Column 18, Claim 29, Line 44, Should read: fingers configured to allow

Column 19, Claim 30, Line 4, Should read: fingers configured to allow

Signed and Sealed this
Twelfth Day of September, 2023

Katherine Kelly Vidal
*Director of the United States Patent and Trademark Office*